Feb. 2, 1971   J. L. BLAKE   3,559,293
INDICATOR DEVICE
Filed Feb. 5, 1969
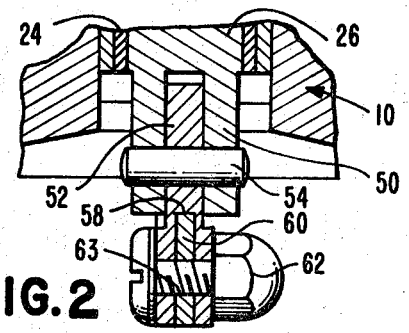
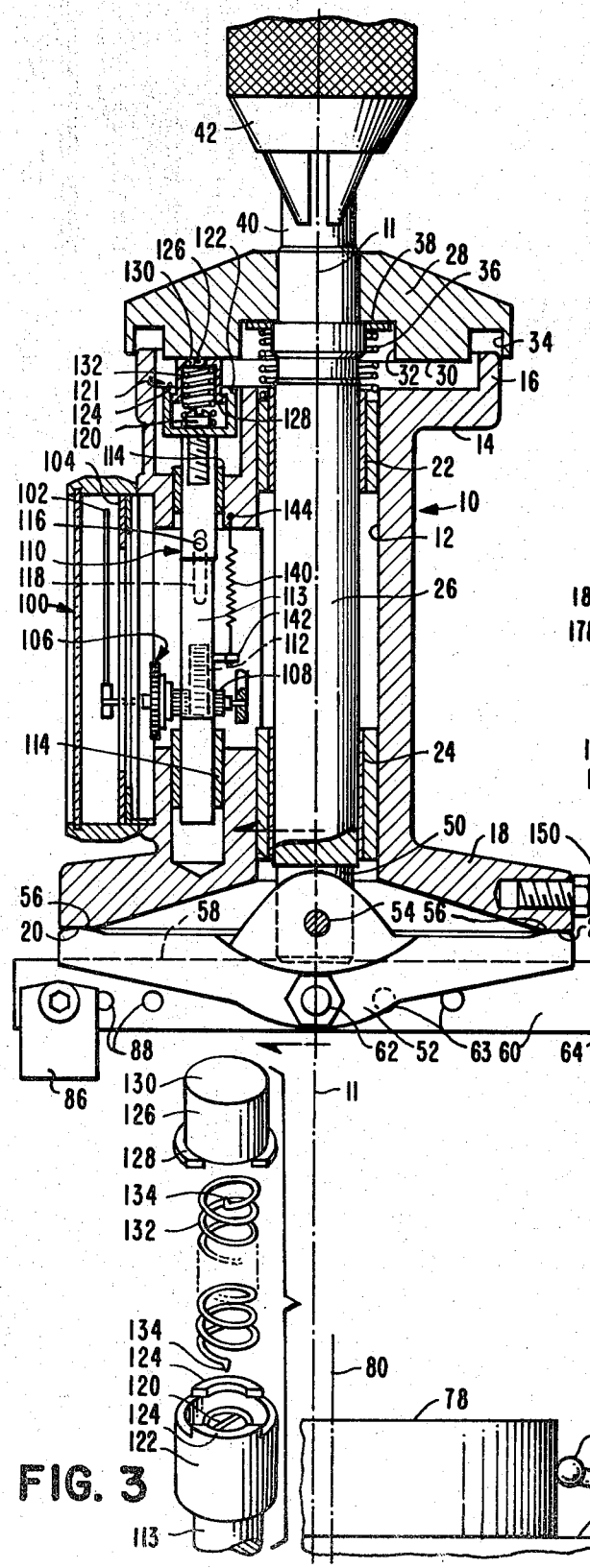
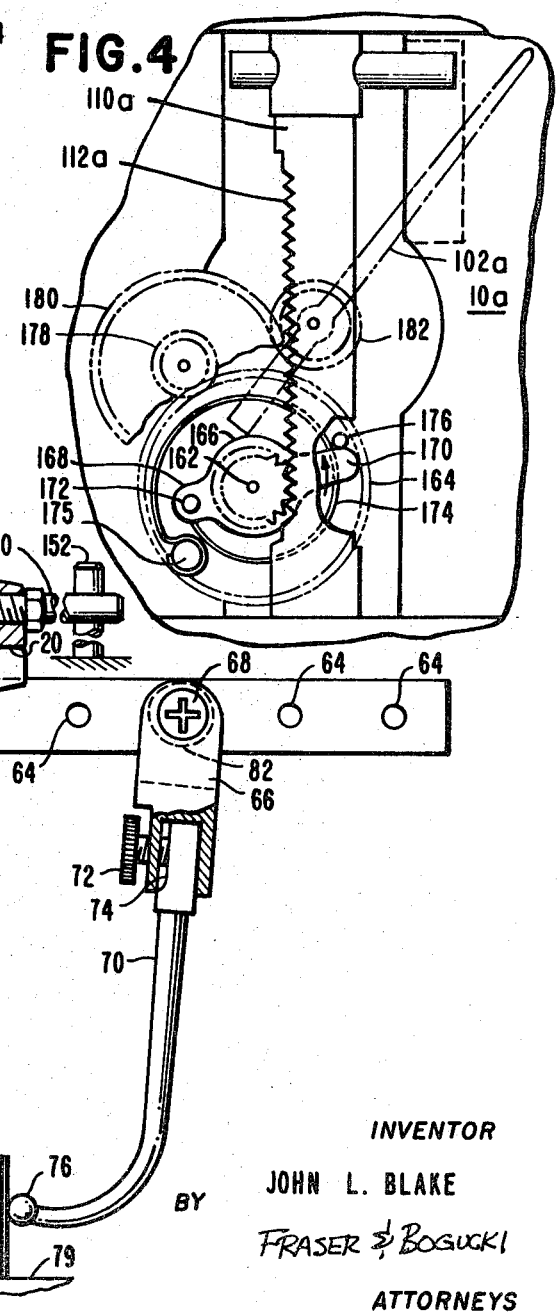
INVENTOR
JOHN L. BLAKE
BY
FRASER & BOGUCKI
ATTORNEYS United States Patent Office 3,559,293
Patented Feb. 2, 1971

3,559,293
INDICATOR DEVICE
John L. Blake, 419 E. Live Oak Ave.,
Arcadia, Calif. 91006
Filed Feb. 5, 1969, Ser. No. 796,828
Int. Cl. G01b 3/22
U.S. Cl. 33—172                                    8 Claims

ABSTRACT OF THE DISCLOSURE

An indicator device is disclosed for locating a workpiece on a machine tool and includes a housing enclosing a rotatable shaft and movable linearly relative thereto in proportion to the deflection of a feeler element carried by the shaft for engagement with a surface of the workpiece. An actuating member transmits the relative linear movement between the housing and shaft to a dial indicator carried by the housing. The actuating member includes first and second portions resiliently biased to a limiting relative position under a preload to protect the dial indicator transmission from shock loads above a minimum level applied to the feeler element.

BACKGROUND OF THE INVENTION

(1) Field of the invention

This invention relates generally to precision indicator instruments utilized primarily for centering a workpiece on a machine tool, and more particularly to protective devices for use in such instruments to prevent damage to the instrument resulting from the application of excessive impact or shock loads to the input of the instrument.

(2) Description of the prior art

The present invention is an improvement of the apparatus of U.S. Pats. Nos. 2,814,124 and 3,115,710 issued to the present inventor on Nov. 26, 1957 and Dec. 31, 1963, respectively.

The aforementioned patents disclose an instrument chiefly employed for precisely locating a workpiece on a horizontal or vertical machine tool relative to a reference axis. The instrument is also useful for detecting, locating and measuring both the amount and direction of out-of-roundness, misalignment and axial taper of a workpiece relative to the reference axis.

One example of the apparatus disclosed in the foregoing patents basically comprises a rotatable shaft having a shank portion at on end adapted to be received by a holding mechanism such as the chuck of a jig borer or similar machine tool for rotation about the spindle axis which may be taken as the reference axis. A centrally pivoted lever is mounted at the other end of the shaft transversely of the axis of the shaft and carries a projecting feeler element whose tip is offset from the reference axis. A flange means, which may, in one example of the device, take the form of a housing, is disposed concentrically about the shaft, and movable axially relative thereto, is biased toward the lever and has an annular, radial end surface bearing against at least one of the outer end portions of the lever. A dial indicator mounted on the housing and actuated by a drive member coupling the indicator transmission with the shaft, displays the amount of relative axial translation between the housing and shaft.

In a typical application of the instrument, in which a workpiece having an outer cylindrical surface is to be centered along the spindle axis, the shaft of the instrument is clamped in the chuck of the machine tool and the housing restrained against rotation. The workpiece is then prepositioned to within the indicator travel range and the feeler element is brought into contact with the cylindrical surface. While the machine spindle is turned under power or by hand, any offset of the axis of the workpiece from the spindle axis will cause the feeler element to be displaced between maximum and minimum points thereby causing the transverse lever to pivot on the shaft and translate the housing axially along the shaft a distance proportional to the offset. The translation of the housing relative to the shaft is transmitted by the drive element to the gear train of the dial indicator. The machine tool table supporting the workpiece is then moved along one of its axes to a point where the indicator hand travel range is minimized thus indicating that the axis of the workpiece is in the plane passing through the spindle axis and perpendicular to the axis of table movement. Lastly, the table is traversed along the other table axis until the indicator hand travel decreases to zero at which point the workpiece and spindle axes coincide.

The initial dial indicator reading is a measurement of the offset of the workpiece axis, the amount of offset being indicated by the total travel of the dial indicator hand through one full revolution of the machine spindle. The direction of the offset is indicated by the radial position of the feeler when the indicator hand is at its high, or low, point of travel.

In its day-to-day use, the moving parts of the instrument may occasionally be subjected to high shock loads when the feeler element is moved too rapidly up against the workpiece. The repeated imposition of such shock loads eventually results in extensive and costly damage to the gear train and other elements of the dial indicator transmission. It is therefore desirable to provide protection for these elements. However, because the indicator deflection must precisely follow the movement of the feeler element, any shock attenuating means utilized cannot be permitted to introduce any lag or error in the reading during application to the feeler element of forces normally experienced during use of the instrument. Further, it is desirable that the shock attenuating means be of simple design so as not to add appreciably to manufacturing costs and permit backfitting of existing units with only minor modifications.

SUMMARY OF THE INVENTION

In accordance with the broad aspects of the present invention, the indicator device basically comprises a shaft carrying a flange means movable relative to the shaft. A lever pivotally connected to one end of the shaft and carrying a feeler element for contact with the workpiece, cooperates with a bearing surface on the flange means to move the flange means relative to the shaft in proportion to the deflection of the feeler element. The relative movement between the flange means and shaft is transmitted by a coupling means to the transmission of an indicator device such as a dial indicator. The coupling means includes first and second relatively movable portions that are resiliently biased under a preload to a limiting position. When forces resulting from shock loads of magnitude above a minimum level applied to the feeler element are imposed on the coupling means, the preload is overcome and the two portions of the coupling means move relative to one another and in conjunction with the inertia of the movable parts of the coupling means and indicator, attenuate the shock loads and thereby protect the indicator transmission.

In one specific form of the invention, the portions of the coupling means comprise a cup and cap assembly forming part of the linearly movable actuating member coupling the shaft and indicator. The cup and cap include engageable transverse lugs and shoulders, respectively, and enclose a compression spring which biases the cup and cap away from one another so as to bring the shoulders on the cap into engagement with the lugs on the cup under a predetermined preload. In this relative orientation of the cap and cup, the actuating member assumes its normally, fully extended length. Deflection of the compression spring and a resulting contraction of the length of the actuating member results from shock loads sufficient to overcome the preload.

In another specific form of the invention, the portions of the coupling means comprise a pinion and a gear mounted on a common shaft for independent rotation relative to one another. A spring couples the pinion and gear and biases the pinion to a normal position in which it engages, under a preload, a stop means carried by the gear. The operation of this embodiment is the same as that already described above with the pinion and the gear moving relative to one another to attenuate shock loads above a minimum level.

BRIEF DESCRIPTION OF THE DRAWINGS

Other aspects and advantages of the present invention will become apparent by reference to the following detailed description taken in conjunction with the accompanying drawings in which:

FIG. 1 is an elevation view, partly in section, of one embodiment of the improved indicator device of the present invention;

FIG. 2 is a cross section view of a portion of the device of FIG. 1 along the plane 2—2;

FIG. 3 is an exploded, perspective view of a portion of the indicator actuating member employed in the embodiment of FIG. 1; and FIG. 4 is a fragmentary elevation view of a portion of the indicator and actuating member utilized in an alternative embodiment of the present invention.

Referring now to FIGS. 1–3, the indicator device of the present invention includes a generally cylindrical, flanged housing 10 concentric of a central axis 11 and having an axial bore 12 extending the length of the housing. The upper end of the housing 10 has an outwardly extending flange 14 having an upright annular rim 16. The lower end of the housing 10 is provided with a projecting flange 18 having a lower peripheral planar surface 20 lying precisely in a plane perpendicular to the central axis 11.

A pair of axially spaced bushings 22 and 24 are disposed within the bore 12 for receiving a shaft 26 for rotation and axial movement relative to the housing 10. The shaft 26 has a circular flange member 28 concentric of the axis 11 and secured to the shaft adjacent the upper end of the housing 10. The flange member 28 has a lower planar surface 30 disposed normal to the central axis 11, a concentric counterbore 32 and a concentric annular recess 34 extending upwardly from the surface 30 adjacent the periphery of the flange member 28. The rim 16 of the housing 10 at all times projects more or less into the recess 34 to form a labyrinth that tends to prevent foreign matter such as dust and other particles from entering the interior of the housing and causing damage to the moving parts therein. A compression spring 36 interposed between the upper surface of the housing 10 and a thrust washer 38 within the counterbore 32 biases the housing 10 and flange member 28 away from one another. The upper end of the shaft 26 is further provided with a reduced diameter shank portion 40 adapted to be received and held by a clamping device such as a chuck 42.

The shaft 26 has a lower, bifurcated end 50 extending from the housing 10. A transverse lever 52 is pivotally connected by a pin 54 within the bifurcated end 50. The opposed ends of the lever are provided with pads 56 adapted to bear against the surface 20. It will be seen that the compression spring 36 is effective to move the housing 10 downwardly on the shaft 26 to a point at which both pads 56 are in contact with the surface 20.

The lever 52 is provided with a longitudinal slot 58 for receiving an elongated bar 60 securely fastened to the lever by a screw and nut fastener 62 extending through one of several holes 63 in the bar 60. One end portion of the bar is provided with a series of equally spaced holes 64. A bifurcated bracket 66 depends from the bar 60 and is attached thereto by a fastener 68 received by one of the holes 64. A feeler element 70 is held in place in the bracket 66 by a thumbscrew 72 threaded in the bracket and bearing against a flattened portion 74 of the shank of the feeler element 70. The feeler element 70 terminates at its lower end in an enlarged tip 76. The tip 76 is shown in engagement, by way of example, with the outer surface of a cylindrical workpiece 78 supported by the machine table 79 and having a central axis 80 offset from the axis 11. As shown in the aforementioned patents, various types of feeler or pointer elements may be attached to the indicator device for performing various centering or locating tasks and may be provided for cooperation with inside or outside cylindrical surfaces. Suitable washers 82 may be disposed between the arms of the bifurcated bracket 66 and the bar 60 to provide a friction joint for safety release in case an excessive load is applied to the tip of the feeler element.

The end portion of the bar 60 opposite the feeler element 70 carries a small weight 86 that counterbalances the weight of the bracket 66 and feeler element. The sensitivity of the instrument may be varied by changing the position of the feeler element along the bar 60, utilization of a hole 64 more distant from the axis 11 providing greater sensitivity. Likewise, sensitivity may be varied by utilizing a different hole 63 for attaching the bar 60 to the lever 52. Any adjustments made to change the position of the feeler element 70 with respect to the axis 11 will be accompanied by a corresponding change in the placement of the weight 86 relative to the axis 11. Several holes 88 in the bar 60 are provided for this purpose. The sensitivity of the instrument is also affected by the diameter of the lever 52 extending between the pads 56. The greater this diameter, the more sensitive the instrument, for a given feeler element length.

It will be seen that in the operation of the device described so far, as the tip 76 of the feeler element 70 is moved laterally with respect to the central axis 11, the lever 52 will be pivoted accordingly about the pin 54. The resulting upward pressure exerted by one or the other of the pads 56 against the surface 20 of the flange 18 will cause the housing 10 to move upwardly against the compression of the spring 36 a distance proportional to the amount of lateral movement of the tip 76.

As shown in FIG. 1, the housing 10 carries a dial indicator 100 for precisely displaying the translation of the housing 10 with respect to the shaft 26 upon lateral deflection of the feeler element 70. The indicator 100 includes a movable pointer 102 adapted to sweep a graduated scale 104. The pointer is driven by a suitable transmission means 106 comprising generally a multiple element gear train for providing the proper ratio. The dial indicator transmission means 106 includes a pinion 108 driven by an actuating member 110 having a gear rack 112 formed along a stem portion 113 for meshing with the pinion 108.

The elongated actuating member 110 is disposed parallel with the axis 11 of the instrument and is carried by spaced bushings 114 for movement relative to the housing 10. A transverse pin 116 carried by the member 110 and projecting therefrom into a longitudinal slot 118 formed in a surface of the housing 10 restrains the member 110 to axial movement within the housing thus maintaining the gear rack 112 in mesh with the pinion 108.

Referring now also to FIG. 3, secured to the upper extremity of the stem 113 of the actuating member 110 by a screw 120 is a head assembly 121 including a tubular cup 122 having a pair of diametrically opposed, inwardly projecting lugs 124. The cup 122 receives an upwardly extending cylindrical cap 126 having a pair of diametrically opposed shoulders 128 and an upper flat surface 130 for slidably engaging the lower surface 30 of the flange member 28. A compression spring 132 received within the cap and cup resiliently biases the lugs 124 of the cup 122 into engagement with the shoulders 128 on the cap 126. The extremities of the spring 132 are provided with spurs 134 which tend to anchor into the opposed horizontal surfaces of the cap and cup respectively so as to prevent rotation of the cap 126 which may result in disengagement from the cup during use of the indicator device.

To assemble the head assembly 121, the spring 132 is placed in the cup over the screw 120. The cap 126 is then placed over the upper end of the spring 132, pressed downwardly until the shoulders 128 enter the cup between the lugs 124, then rotated to bring the shoulders 128 into approximate axial alignment with the lugs 124 and then released. The spring 132 acts to bias the cap 126 upwardly to press the shoulders 128 against the lugs 124 under a preload. According to one example, a preload between about .8 pound and about 1 pound was found to be satisfactory. The upper surface 130 of the head 121 is maintained in continuous engagement with the surface 30 by a light tension spring 140 coupled between a pin 142, extending laterally from the member 110, and a point 144 on the housing 10. The spring rate of the spring 140 is considerably less than that of the compression spring 132 and the force exerted by the spring 140 is relatively small compared to the preload produced by the spring 132.

When using the indicator device of the present invention, the shaft 26 is rotated by means of the chuck 42 thus causing rotation of the lever 52, the bar 60 and the feeler element 70 about the axis 11. The housing 10 is restrained against rotation by an arm 150, threadedly received by, and extending radially from the flange 18 and slidably engaging a stationary, vertical post 152 appropriately secured to the table 79 of the machine tool. As the shaft 26 and feeler element 70 rotate about the axis 11, the tip 76 of the feeler element is brought into engagement with the outer surface of the workpiece 78. The workpiece 78 may be adjustably positioned relative to the axis 11 of the machine by movement of the table 79. Any offset between the axes 80 and 11 of the workpiece and the machine, respectively, is translated into a corresponding cyclical axial movement of the housing 10 relative to the shaft 26 as a result of the action of the lever described earlier. It will be appreciated that because the head 121 of the actuating member 110 rides in contact with the lower planar surface 30 of the flange member 28 securely affixed to the shaft, the member 110 remains stationary with respect to the shaft 26 while the housing 10 moves relative thereto. The relative axial movement between the member 110 and the housing 26 causes movement of the indicator pointer 102 via the transmission means 106 which is actuated by the gear rack and pinion combination.

Although the moving parts of the dial indicator, including the gear train, are designed to have extremely low inertia, nevertheless such inertia becomes significant upon the application of high accelerational forces such as those which may result from a shock load being applied to the feeler element. In actual practice, this may occur from time to time when the operator of the machine tool moves the workpiece, for example, into sudden contact with the feeler element. The sharp impact is transmitted to the gear train of the indicator with the result that, after repeated abuse, some of the gears in the indicator transmission may be stripped or otherwise severely damaged. Because the moving parts of the indicator are of extreme precision they are expensive and repair costs are accordingly relatively high. The construction of the actuator member of the present invention functions to attenuate the effects of shock loads above a minimum level. With the application of an excessive shock load to the feeler element the preload of the spring 132 is overcome and compression of the spring occurs. The response of the spring-mass system, comprising the spring 132, cup 122, stem 113, and the gear train and other movable parts of the indicator 100, is such that the sharp shock load input is seen as an attenuated, longer duration pulse by the movable elements of the indicator.

Loads applied to the feeler element during the normal operation of the device are insufficient to overcome the pre-load of the spring 132 and the actuating member 110 retain its normally fully extended length in which the shoulders 128 of the cap 126 and the lugs 124 of the cup 122 remain in engagement.

Turning now to FIG. 4 of the drawings, an alternative embodiment of the present invention is shown which may be utilized by itself or in combination with the embodiment of FIGS. 1–3. In FIG. 4, the actuating member 110a, disposed for axial movement within the housing 10a, is provided with a gear rack 112a for driving a pinion 160 comprising the input element of the dial indicator 100a. The pinion 160 is journaled on a shaft 162 whose ends are received by suitable bearing means (not shown) carried by the housing 10a. A gear 164 is mounted on the shaft 162 concentric with the pinion 160 but is rotatable independently thereof. Secured to the pinion 160 for rotation therewith is a plate member 166 having diametrically opposed arms 168 and 170. An anchor pin 172 is carried adjacent the outer extremity of the shorter arm 168 and is connected to the inner end of a flat spiral spring 174 whose outer end is looped about an anchor pin 175 projecting from one face of the gear 164. The spiral spring 174, having a tendency to unwind, tends to move the pinion 160 and plate member 166 counterclockwise relative to the gear 164. A stop pin 176 affixed to and projecting from the gear 164 is engaged by the longer arm 170 of the plate member 166 to limit the counterclockwise rotation of the pinion 160. It will be appreciated that should the plate member 166 and pinion 160 be rotated away from the stop pin 176 and released, under the biasing of the spring 174, the pinion and plate member will snap back until the arm 170 once again engages the stop pin 176. Thus, the spring 174 functions to resiliently bias the pinion 160 under a preload to a predetermined relative position, that is, the position in which the arm 170 of the plate member 166 is in contact with the stop pin 176.

The gear 164 is in mesh with a small pinion 178 mounted for co-rotation with concentric gear 180 which, in turn, meshes with the drive gear 182 of the movable indicator pointer 102a.

The operation of the embodiment of FIG. 4 is basically the same as that described in connection with the embodiment of FIGS. 1–3. During normal operation of the instrument under normal loads applied to the feeler element, that is, loads less than a minimum level, the arm 170 remains in engagement with the stop pin 176 and the pinion 160 and gear 164 rotate in unison. Should a sudden shock load above the minimum level be applied to the feeler member and transmitted to the actuating member 110a, the pinion and plate member will move momentarily clockwise relative to the gear 164 due to the inertia of the moving parts including the gear 164 and all of the parts driven thereby. In this way, as in the case of the first embodiment, the shock load is greatly attenuated and the delicate precision mechanism of the dial indicator is suitably protected.

What is claimed is:

1. An indicator device comprising:

a shaft;

flange means carried by said shaft for movement relative to said shaft;

a lever pivotally connected to said shaft, said lever being adapted to carry feeler means for cooperation with a surface of a workpiece, at least a portion of said lever being adapted for engagement with said flange means, deflection of said feeler means pivoting said lever on said shaft to move said flange means relative to said shaft a distance proportional to the amount of said deflection;

means for indicating the relative movement between said flange means and shaft, said indicating means including transmission means; and means coupling said shaft and said transmission means, said coupling means adapted to transmit to said transmission means relative movement between said flange means and shaft, said coupling means including first and second relatively movable portions and means for resiliently biasing said portions under a preload to a predetermined relative position, said portions adapted to move relative to one another from said predetermined relative portion upon the application to said feeler means of shock loads exceeding a minimum level to thereby attenuate said shock loads and protect said transmissions means.

2. An indicator device as defined in claim 1 in which: said first and second portions of said coupling means are movable linearly relative to one another.

3. An indicator device as defined in claim 1 in which: said first and second portions of said coupling means are rotatable relative to one another.

4. An indicator device comprising.

a housing having a radially disposed end surface;

a shaft journaled in said housing for rotatable and axial movement relative thereto;

a lever member pivotally secured to one end of said shaft and having at least a laterally disposed portion in continuous slidable engagement with said housing end surface, said lever being adapted to carry a feeler member;

a flange fixed to said shaft adjacent the end of said housing remote from said end surface, said flange having a radially extending surface;

a dial indicator carried by said housing and having movable parts including transmission means;

an actuating member carried by said housing for movement parallel to the axis of said shaft and including a first portion in continuous, slidable engagement with said radially extending surface of said flange, a second portion coupled to said transmission means, and resilient biasing means urging said first portion away from said second portion to a limiting position under a preload, in which limiting position said actuating member assumes a fully extended length, said resilient biasing means operating, in conjunction with the inertia of the second portion of said actuating member and said movable parts of said indicator, to attenuate shock loads applied to said feeler member exceeding a predetermined minimum value.

5. An indicator device comprising.

a housing having a radially disposed end surface;

a shaft journaled in said housing for rotation and axial movement relative thereto;

a lever pivotally connected to said shaft, said lever being adapted to carry a feeler element for cooperation with a surface of a workpiece, said lever having at least a portion in sliding engagement with said housing end surface, deflection of said feeler element causing said lever to pivot and translate said housing axially relative to said shaft a distance proportional to said deflection;

indicator means carried by said housing, said indicator means including transmission means; and means coupling said shaft and said transmission means for transmitting relative axial movements between said shaft and housing to said indicator means, said coupling means including:

a pinion;

a gear mounted on a common shaft with said pinion for independent rotation relative thereto;

an arm secured to said pinion and projecting therefrom;

stop means carried by said gear;

spring means coupling said pinion and gear, said spring means biasing said pinion to a normal position in which said arm engages said stop means under a preload whereby shock loads above a minimum level, transmitting to said coupling means from said feeler element, cause deflection of said spring and relative rotation between said pinion and gear to attenuate said shock loads and protect said transmission means.

6. An indicator device including:

an elongated housing having a radially disposed, planar end surface;

a shaft journaled in said housing for rotation and axial movement relative thereto;

a radially extending flange secured to said shaft adjacent the housing end opposite said planar end surface;

a lever pivotally secured to an end of said shaft, said lever being adapted to carry a feeler element for cooperation with a surface on a workpiece and having at least one lateral portion in slidable engagement with said planar end surface of said housing, deflection of said feeler element causing pivoting of said lever and axial displacement of said housing relative to said shaft in proportion to said deflection of said feeler element;

a dial indicator carried by said housing, said indicator having movable parts including a gear train;

an actuating member, carried by said housing, coupling said flange on said shaft and said indicator gear train and restrained to axial movement within housing, said actuating member including:

a stem extending parallel to said axis of said shaft and having a gear rack formed along a portion thereof, said gear rack being in meshing engagement with said gear train;

a cylindrical cup affixed to the end of said stem adjacent said shaft flange, said cup being coaxial of said stem and having an upper edge including inwardly extending lug means;

a cylindrical cap received by said cup coaxially therewith and having a lower edge including outwardly extending shoulder means, said cap having an upper planar surface adapted to slidably engage a radial, planar surface of said flange;

a compression coil spring disposed within said cap and cup coaxially therewith and biasing said cap upwardly whereby said lug means and shoulder means are normally pressed into engagement under a preload; and a tension coupling said actuating member and said housing for biasing said upper planar surface of said cap into continuous engagement with said planar surface of said shaft flange, said tension spring having a substantially lower spring rate than said compression coil spring.

7. An indicator device as defined in claim 6 in which: said planar surface of said shaft flange has an annular recess adjacent the periphery of said flange; and said housing includes peripheral rim extending at all times into said annular recess whereby a labyrinth passage is formed for impeding the entry of foreign matter into the interior of the indicator device.

8. An indicator device as defined in claim 6 in which:

a radially extending bar is affixed to said lever, said feeler element being attached to said bar at a point offset from the axis of the shaft, said bar having a plurality of attachment points along its length for receiving said feeler element and for affixing said bar to said lever whereby the sensitivity of the instrument may be controlled; and a weight is connected to said bar and adjustably positionable along a portion of said bar diametrically opposite said feeler element for counterbalancing said feeler element.

References Cited

UNITED STATES PATENTS

| | | | |
|---|---|---|---|
| 2,518,524 | 8/1950 | Cook | 33—172B |
| 2,588,131 | 3/1952 | Lester | 33—170 |
| 3,222,788 | 12/1965 | Neslund | 33—148E |
| 3,324,561 | 6/1967 | Zwierzynski et al. | 33—170X |

WILLIAM D. MARTIN, JR., Primary Examiner

U.S. Cl. X.R.

33—148

PO-1050
(5/69)

UNITED STATES PATENT OFFICE
CERTIFICATE OF CORRECTION

Patent No. 3,559,293      Dated February 2, 1971

Inventor(s) John L. Blake

It is certified that error appears in the above-identified paten and that said Letters Patent are hereby corrected as shown below:

Column 1, line 50, for "on" read --one--. Column 6, ] 24, for "retain" read --retains--. Column 7, line 32, for "transmissions" read --transmission--; line 39, after "comp ing" delete the period (".") and insert a colon (--:--); li after "comprising" delete the period (".") and insert a col (--:--). Column 8, line 67 after "tension" and before "cot insert --spring--.

Signed and sealed this 28th day of September 1971.

(SEAL)
Attest:

EDWARD M. FLETCHER, JR.      ROBERT GOTTSCHALK
Attesting Officer      Acting Commissioner of Pa